(12) United States Patent
Smullin et al.

(10) Patent No.: US 11,127,192 B2
(45) Date of Patent: Sep. 21, 2021

(54) SYSTEMS AND METHODS FOR ANALYZING MANUFACTURABILITY OF THREE-DIMENSIONAL DESIGNS

(71) Applicant: X Development LLC, Mountain View, CA (US)

(72) Inventors: Sylvia J. Smullin, Menlo Park, CA (US); Albin Lee Jones, Half Moon Bay, CA (US); Joseph Sargent, San Francisco, CA (US); Marina Dolivo, San Jose, CA (US)

(73) Assignee: X Development LLC, Mountain View, CA (US)

( * ) Notice: Subject to any disclaimer, the term of this patent is extended or adjusted under 35 U.S.C. 154(b) by 26 days.

(21) Appl. No.: 16/721,661

(22) Filed: Dec. 19, 2019

(65) Prior Publication Data

US 2021/0192831 A1 Jun. 24, 2021

(51) Int. Cl.
| | | |
|---|---|---|
| *G06T 15/08* | (2011.01) | |
| *G06T 17/00* | (2006.01) | |
| *G06T 19/20* | (2011.01) | |
| *B33Y 50/02* | (2015.01) | |
| *G06F 30/17* | (2020.01) | |

(52) U.S. Cl.
CPC ............. *G06T 15/08* (2013.01); *B33Y 50/02* (2014.12); *G06F 30/17* (2020.01); *G06T 17/00* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 9,747,394 B2 | 8/2017 | Nelaturi et al. | |
| 2006/0088200 A1* | 4/2006 | Du | G06T 7/001 382/144 |
| 2014/0275706 A1* | 9/2014 | Dean | A61N 5/1031 600/1 |
| 2015/0170401 A1* | 6/2015 | Major | G06T 17/00 345/424 |
| 2017/0232517 A1* | 8/2017 | Morton | G06F 30/17 419/29 |
| 2018/0011398 A1* | 1/2018 | Tel | G03F 1/36 |
| 2019/0039368 A1 | 2/2019 | Zeng et al. | |
| 2020/0371493 A1* | 11/2020 | Uzawa | G05B 23/0289 |

FOREIGN PATENT DOCUMENTS

GB 2477828 A 8/2011

* cited by examiner

*Primary Examiner* — Michelle Chin
(74) *Attorney, Agent, or Firm* — Christensen O'Connor Johnson Kindness PLLC

(57) ABSTRACT

In some embodiments, techniques are provided for analyzing the manufacturability or fabricability of objects based on segmented designs. In some embodiments, a scanning device scans a manufacturing device and/or an object manufactured by the manufacturing device to characterize a manufacturing capability of the manufacturing device. A paintbrush pattern may be determined based on the characterization, and a proposed design may be determined to be fabricable or non-fabricable using the paintbrush pattern.

20 Claims, 5 Drawing Sheets

SYSTEMS AND METHODS FOR ANALYZING MANUFACTURABILITY OF THREE-DIMENSIONAL DESIGNS

TECHNICAL FIELD

This disclosure relates generally to manufacturing, and in particular but not exclusively, relates to analyzing three-dimensional designs to be manufactured.

BACKGROUND

Additive manufacturing, also known as three-dimensional (3D) printing, holds the possibility of an entirely new way of making shapes out of such diverse materials as plastic, metal, and chocolate. Though 3D printers can print objects that cannot be made by traditional subtractive machining techniques, there are still limitations to what objects can be printed with a given printer, based at least on a resolution of the printer and material properties of whatever material is being printed.

Unfortunately, the functionality of software for generating designs to be 3D printed is limited. While some software exists for generating complex designs that can only be realized through additive manufacturing, such software typically does not operate with a detailed understanding of the capabilities of a particular manufacturing device to be used. Accordingly, such software may generate designs that are not fabricable. What is desired are methods and systems that ensure that generated designs are fabricable.

SUMMARY

In some embodiments, a non-transitory computer-readable medium is provided. The computer-readable medium has logic stored thereon that, in response to execution by one or more processors of a computing system, cause the computing system to perform actions comprising characterizing, by the computing system, a manufacturing capability of a manufacturing device; determining, by the computing system, a paintbrush pattern based on the characterization of the manufacturing capability of the manufacturing device; receiving, by the computing system, a proposed design; and determining, by the computing system, whether the proposed design is fabricable by the manufacturing device based on the paintbrush pattern.

In some embodiments, a system comprising a manufacturing device and a design validation system is provided. The design validation system includes at least one computing device configured with logic that, in response to execution, causes the design validation system to perform actions comprising characterizing, by the design validation system, a manufacturing capability of the manufacturing device; determining, by the design validation system, a paintbrush pattern based on the characterization of the manufacturing capability of the manufacturing device; receiving, by the design validation system, a proposed design; and determining, by the design validation system, whether the proposed design is fabricable by the manufacturing device based on the paintbrush pattern.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

In some embodiments of the present disclosure, techniques are provided to allow better design of objects created via additive manufacturing. A given manufacturing device is characterized in order to determine a three-dimensional "paintbrush pattern" the manufacturing device is capable of producing. The paintbrush pattern can then be used to analyze a proposed design in order to determine whether the manufacturing device is capable of fabricating the proposed design. If not, the proposed design may be tweaked to become fabricable, or settings may be changed on the manufacturing device in order to change its capabilities.

Figure 1:
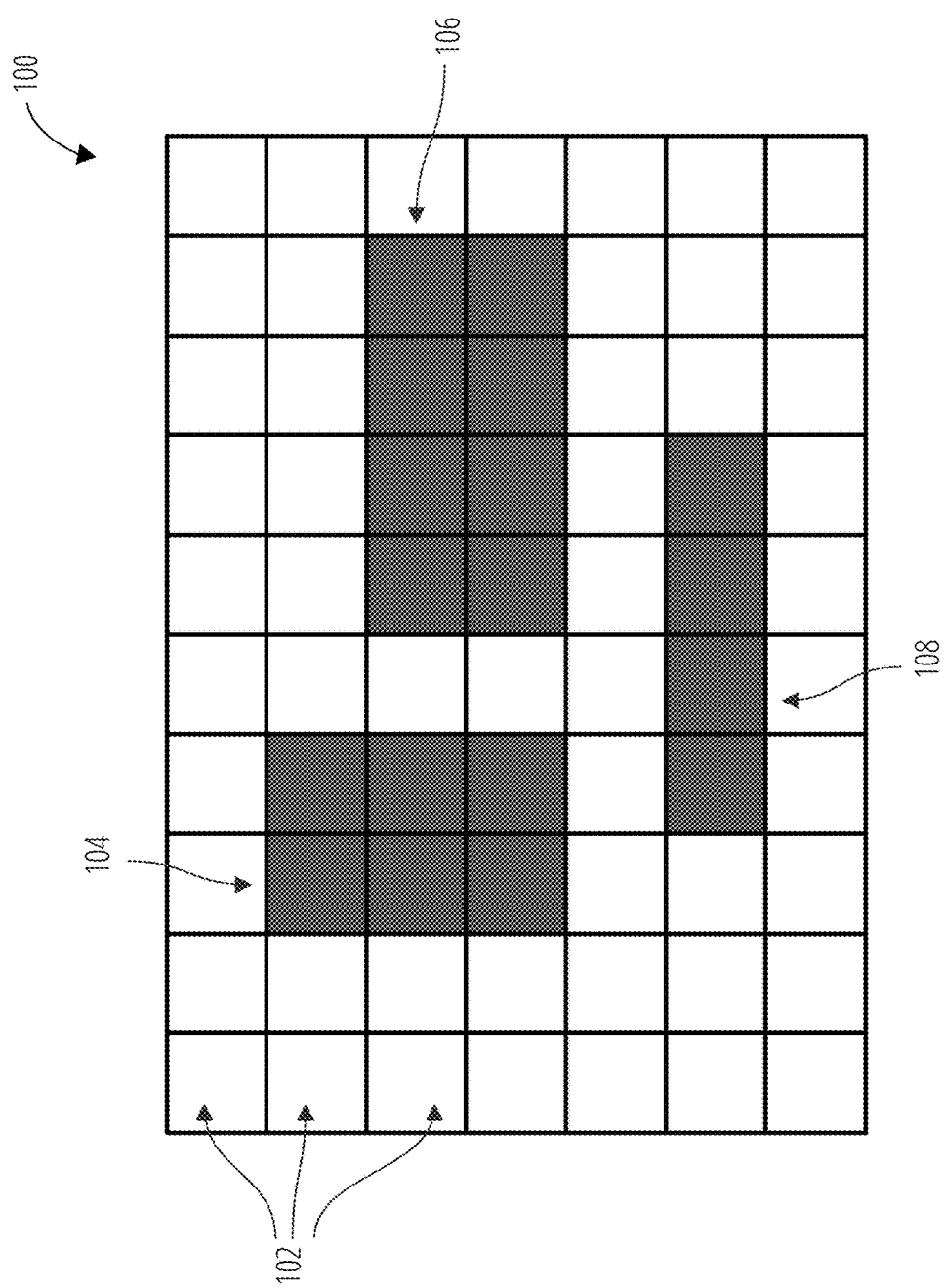
FIG. 1 is a schematic drawing that illustrates a non-limiting example embodiment of a segmented design according to various aspects of the present disclosure.

FIG. 1 is a schematic drawing that illustrates a non-limiting example embodiment of a segmented design according to various aspects of the present disclosure. The present disclosure assumes that proposed designs to be used to represent the object to be manufactured are "segmented designs." In other words, the designs are broken into a plurality of discrete segments that denote a type of material (or an absence of a material) present at a plurality of locations in the design. In some embodiments, a proposed design may be provided that is not yet broken into segments, and the design may be broken into segments before further processing described herein is performed.

Each of the illustrated segments 102 represents a location in the proposed segmented design that can either include a material or not include a material. As illustrated, segments that are white indicate a lack of the material, and segments that are dark (such as the first pattern 104, the second pattern 106, and the third pattern 108, indicate a presence of the material. For example, in an additive manufacturing process (e.g., a 3-D printer), segments that are white may represent locations that do not include a material, and segments that are dark may represent locations that do include the material.

This description is a non-limiting example only, and in some embodiments, the white and dark segments may have another meaning within the segmented design 100. In some embodiments, the segmented design 100 may include more than two colors. For example, a white segment may indicate a lack of material, a segment in a first color may indicate presence of a first material, and a segment in a second color may indicate a presence of a second material.

As shown, the segmented design 100 includes a plurality of segments 102 laid out in a two-dimensional grid. The segmented design 100 is shown as two-dimensional for ease of illustration. One will recognize that the two-dimensional designs illustrated herein are adaptable to three-dimensions, either by stacking multiple two-dimensional designs, or by extending the illustrated techniques into a third dimension, such that instead of square segments as illustrated, the segmented design may include a plurality of three-dimensional voxels. The voxels in such a design may be asymmetric along any axis. For example, the voxels may have a different shape or size in a horizontal plane compared to a shape or size in a vertical plane. In some embodiments, the segmented design may include segments of different sizes and/or shapes. For example, voxels that represent presence of a first material could be a different shape and/or size than voxels that represent presence of a second material, or of empty space.

Typically, a manufacturing device can duplicate any segmented design provided to it, subject to certain constraints. For example, a minimum feature size, a minimum feature shape, or any other constraint may be specified by the manufacturing device as limitations on the segmented designs that the fabrication system can fabricate. Other factors, such as an amount of wear on the manufacturing device, an ambient temperature, a characteristic of a manufacturing material, and other factors may also affect the performance of the manufacturing device. From these constraints, a "paintbrush pattern" can be determined. In some embodiments, the paintbrush pattern represents the size and shape of a smallest feature that can be generated by a given manufacturing device. If a given segmented design can be created by tiling the paintbrush pattern over the segmented design, then the segmented design is fabricable using the associated manufacturing device. If one or more portions of the segmented design cannot be drawn with the paintbrush pattern, then the segmented design is not fabricable using the associated manufacturing device. In some embodiments, if a manufacturing device can fabricate devices with more than one material, separate constraints (and therefore separate paintbrush patterns) may be provided for each different material.

Figure 2:
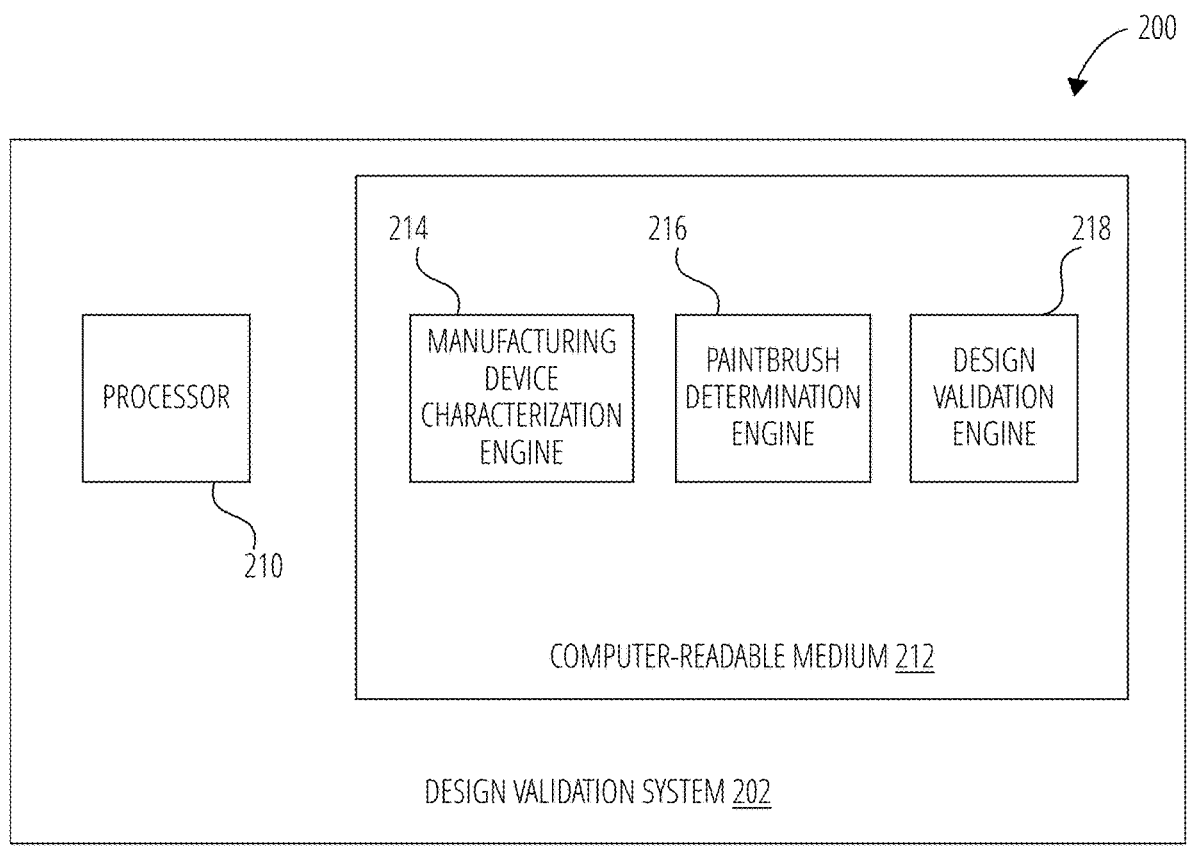
FIG. 2 is a block diagram of a non-limiting example embodiment of a system for generating, validating, and manufacturing segmented designs according to various aspects of the present disclosure.
Figure 2:
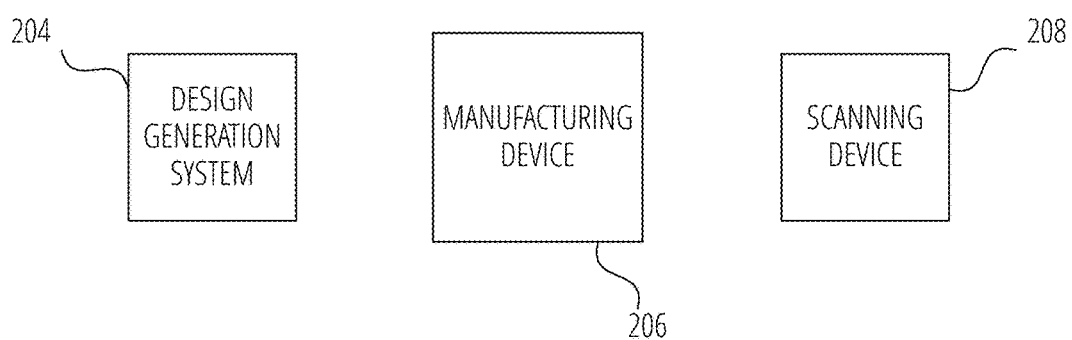

FIG. 2 is a block diagram of a non-limiting example embodiment of a system for generating, validating, and manufacturing segmented designs according to various aspects of the present disclosure. Overall, the system 200 is configured to generate, validate, and manufacture objects using segmented designs.

The system 200 includes a design generation system 204, a manufacturing device 206, a scanning device 208, and a design validation system 202. The design generation system 204, manufacturing device 206, scanning device 208, and design validation system 202 are configured to communicate with each other as described below using any suitable technology, including but not limited to wireless technologies (including but not limited to 2G, 3G, 4G, 5G, LTE, Wi-Fi, WiMAX, and Bluetooth), wired technologies (including but not limited to Ethernet, USB, and FireWire), and/or combinations thereof. The design generation system 204, manufacturing device 206, scanning device 208, and design validation system 202 may also communicate with each other via the exchange of a removable computer-readable medium, including but not limited to a floppy disk, an optical disk, or a USB drive.

In some embodiments, the design generation system 204 may include one or more computing devices that are configured to generate proposed segmented designs. Any technique may be used by the design generation system 204 to generate the proposed segmented designs. For example, the design generation system 204 may provide design software, such as computer-aided drafting (CAD) software, that allows a user to generate a proposed segmented design. As another example, the design generation system 204 may be configured to automatically generate proposed segmented designs using artificial intelligence techniques including but not limited to genetic algorithms and feedforward/back-propagation techniques in order to achieve specific design goals or to maximize various performance metrics.

In some embodiments the manufacturing device 206 may be any type of device that can manufacture objects based on segmented designs. Non-limiting examples of manufacturing devices include digital light projector (DLP) 3D printers, stereolithography devices, powder bed fusion devices, material jetting devices, continuous liquid interface production (CLIP) devices, subtractive manufacturing devices such as CNC milling devices, and fused filament fabrication devices. In some embodiments, the manufacturing device 206 may be able to manufacture objects that include more than one material, including but not limited to a structural material and a temporary support material, or multiple different structural materials.

In some embodiments, the scanning device 208 is configured to generate three-dimensional models of objects. These models may then be used by other portions of the system 200 to characterize manufacturing capabilities of the manufacturing device 206 as discussed in detail below. The scanning device 208 may be any suitable type of device and use any suitable scanning technology, including but not limited to a structured-light 3D scanning device, a triangulation 3D laser scanning device, and a conoscopic laser scanning device.

In some embodiments, the design validation system 202 includes one or more computing devices that are configured to include or provide the illustrated components. In some embodiments, one or more desktop computing devices, laptop computing devices, mobile computing devices, tablet computing devices, server computing devices, or computing devices of other form factors may be combined to provide the functionality of the design validation system 202. In some embodiments, the functionality of the design validation system 202 may be provided by one or more computing devices of a cloud computing system.

As shown, the design validation system 202 includes one or more computing devices that collectively include one or more processors 210 and at least one computer-readable medium 212. The computer-readable medium 212 has logic stored thereon that, in response to execution by the one or more processors 210, cause the design validation system 202 to provide a manufacturing device characterization engine 214, a paintbrush determination engine 216, and a design validation engine 218.

In some embodiments, the manufacturing device characterization engine 214 is configured to receive a scan of the manufacturing device 206 generated by the scanning device 208, and to conduct measurements of the scan in order to characterize the manufacturing device 206. In some embodiments, the paintbrush determination engine 216 is configured to use the measurements generated by the manufacturing device characterization engine 214 to determine a three-dimensional paintbrush pattern that represents the size and shape of the smallest features the manufacturing device 206 is capable of generating in one or more materials. In some embodiments, the design validation engine 218 is configured to use the paintbrush pattern to analyze a proposed segmented design received from the design generation system 204 in order to determine whether the proposed segmented design can be fabricated by the manufacturing device 206. Further details of the functionality of each of these components are provided below.

As used herein, the term "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

Figure 3:
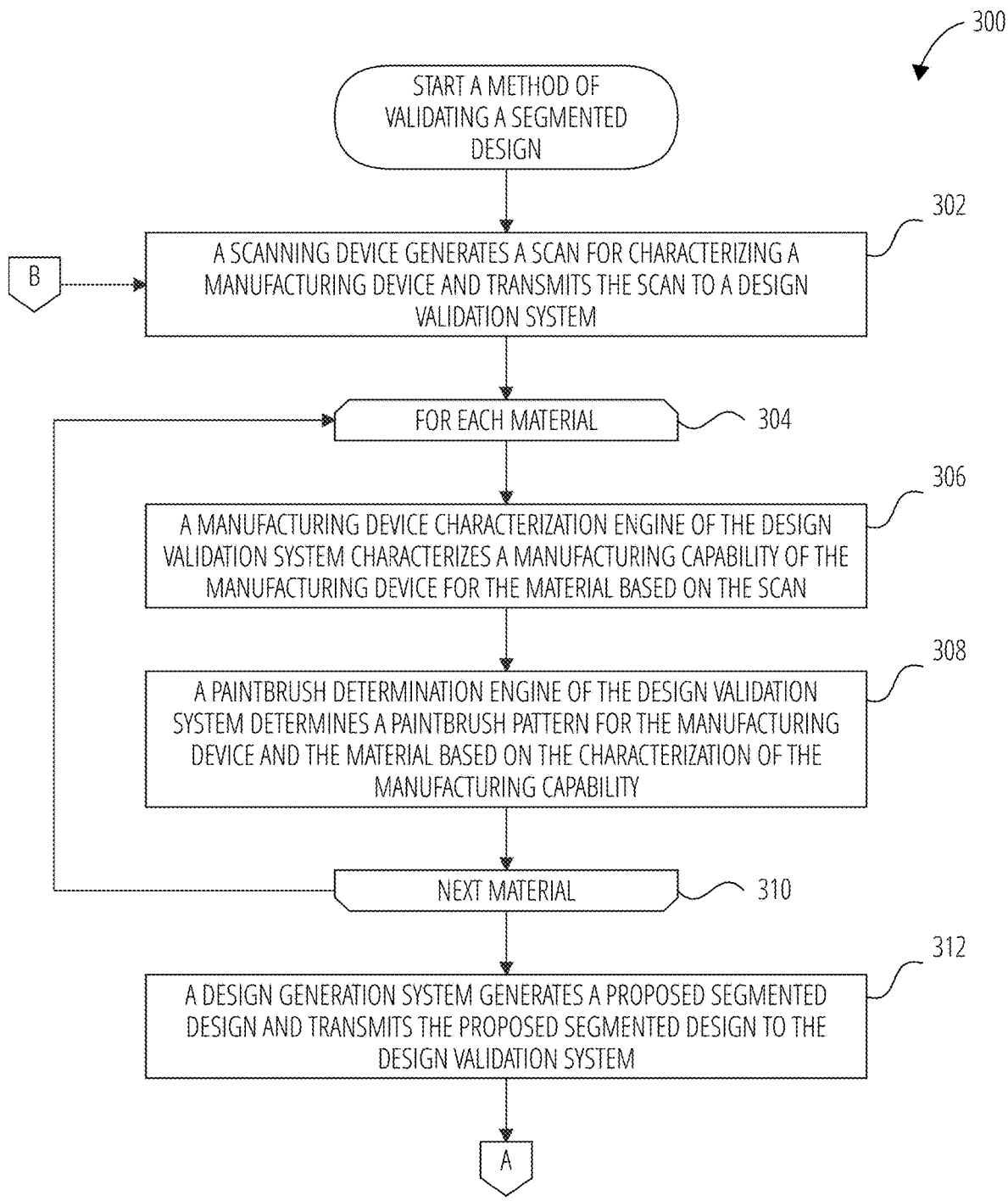
FIG. 3-FIG. 4 are a flowchart that illustrates a non-limiting example embodiment of a method for validating a segmented design according to various aspects of the present disclosure
Figure 4:
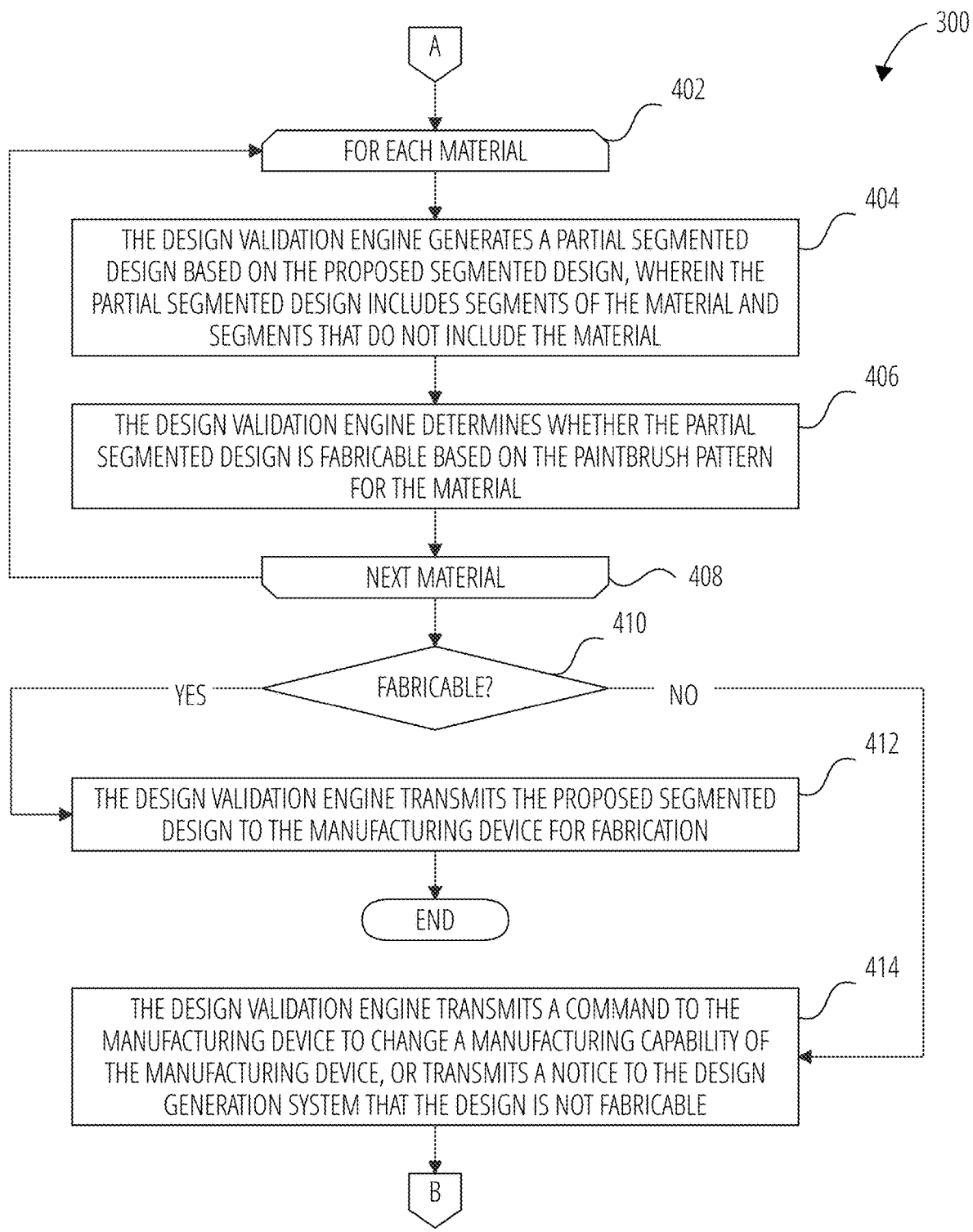

FIG. 3-FIG. 4 are a flowchart that illustrates a non-limiting example embodiment of a method for validating a segmented design according to various aspects of the present disclosure. In the method 300, a proposed segmented design is validated by the design validation system 202 to ensure that the manufacturing device 206 can fabricate the proposed segmented design. If valid, the design validation system 202 may provide the proposed segmented design to the manufacturing device 206 for fabrication. If invalid, the design validation system 202 may attempt to change settings of the manufacturing device 206 in order to make the design fabricable, or may inform the design generation system 204 that changes to the proposed segmented design should be made.

From a start block, the method 300 proceeds to block 302, where a scanning device 208 generates a scan for characterizing a manufacturing device 206 and transmits the scan to a design validation system 202. In some embodiments, the scanning device 208 may generate a scan of a functional part of the manufacturing device 206, such as an extruder nozzle, a print head, a lens, an LCD panel, or any other portion of the manufacturing device 206 that has an effect on the minimum feature size and minimum feature shape that can be generated by the manufacturing device 206. In some embodiments, the scan may include separate scans for portions of the manufacturing device 206 responsible for printing different materials, such as if separate print heads or extruder nozzles are provided for separate materials. In some embodiments, the scan may include retrieving values from a look-up table that can be used to determine the minimum feature size and minimum feature shape.

In some embodiments, the manufacturing device 206 may be instructed to fabricate a test object which has features designed to stress the minimum feature size and minimum feature shape that can be generated by the manufacturing device 206. The scanning device 208 may then scan the test object in order to measure the feature sizes and shapes that the manufacturing device 206 was able to generate in the test object. In some embodiments, the test object may include more than one material, and separate scans may be performed for each material. In some embodiments, separate test objects may be created for each material the manufacturing device 206 is capable of using.

The method 300 then proceeds to a for-loop defined between a for-loop start block 304 and a for-loop end block 310, wherein each separate material manufacturable by the manufacturing device 206 is processed to determine a paintbrush pattern that represents the capability of the manufacturing device 206 to generate objects made from the material.

From the for-loop start block 304, the method 300 proceeds to block 306, where a manufacturing device characterization engine 214 of the design validation system 202 characterizes a manufacturing capability of the manufacturing device 206 for the material based on the scan. The manufacturing capability is typically the minimum feature size and minimum feature shape that can be created by the manufacturing device 206.

The characterization may be based on a measurement of data within the scan. For example, the scan may include a three-dimensional model of an extruder nozzle, and the measurement may be of the shape of the extruder nozzle. As another example, if performing the scan included a reference to a look-up table, the characterization may include analyzing the values retrieved from the look-up table. The manufacturing device characterization engine 214 may then characterize the manufacturing capability by determining the minimum feature size and minimum feature shape that the extruder nozzle can make based on the measured shape. As another example, the scan may include a three-dimensional model of a print head that shows individual spray nozzles of the print head. The manufacturing device characterization engine 214 may then characterize the manufacturing capability by measuring a spray nozzle and determining the likely spray pattern at a minimum distance from the printed object. As yet another example, if the scan is of a sample object, the manufacturing device characterization engine 214 may characterize the manufacturing capability by measuring characteristics of the sample object to determine, for example, if the characteristics were accurately reproduced, the size of layers, and/or the resolution of curves of the sample object.

At block 308, a paintbrush determination engine 216 of the design validation system 202 determines a paintbrush pattern for the manufacturing device 206 and the material based on the characterization of the manufacturing capability. The paintbrush pattern represents the manufacturing capability, and is broken into segments that match a resolution of the proposed segmented designs. As a simplified example, if the manufacturing device characterization engine 214 characterized the manufacturing capability by determining that the minimum feature size and shape that could be created by a given manufacturing device 206 is a cube that is 2 mm by 2 mm by 2 mm, and the segments of the proposed segmented designs are specified as voxels that are cubes of 0.5 mm by 0.5 mm by 0.5 mm, then the paintbrush pattern would be a cube that is 4 segments by 4 segments by 4 segments (or 4 voxels by 4 voxels by 4 voxels). Typically, the resolution of the segmented designs is higher than the resolution of the manufacturing device 206, such that paintbrush patterns include more than one segment. Naturally, if the resolution of the segmented design is lower than the resolution of the manufacturing device 206, any possible segmented design would be fabricable, and the method 300 would not provide many of its significant benefits.

The method 300 then advances to the for-loop end block 310. If more materials remain to be processed, then the method 300 returns from the for-loop end block 310 to the for-loop start block 304 to process the next material. Otherwise, the method 300 proceeds to block 312.

At block 312, a design generation system 204 generates a proposed segmented design and transmits the proposed segmented design to the design validation system 202. As discussed above, any technique for generating the proposed segmented design may be used. In some embodiments, the design generation system 204 may provide software that allows a user to create the proposed segmented design, such as a computer-aided drafting (CAD) application. In some embodiments, the design generation system 204 may automatically create the proposed segmented design using a machine learning technique. In some embodiments, the proposed segmented design may indicate locations for one or more materials, and may also indicate locations for empty space.

The method 300 then proceeds to a continuation terminal ("terminal A"). From terminal A (FIG. 4), the method 300 proceeds to a for-loop defined between a for-loop start block 402 and a for-loop end block 408, wherein each separate material specified in the proposed segmented design is processed to determine if the manufacturing capabilities of the manufacturing device 206 can fabricate the portions of the proposed segmented design made from the material.

From the for-loop start block 402, the method 300 proceeds to block 404, where the design validation engine 218 generates a partial segmented design based on the proposed segmented design, wherein the partial segmented design includes segments of the material and segments that do not include the material. That is, the partial segmented design includes two types of segments: segments from the proposed segmented design that include the material currently being processed by the for-loop, and segments that include anything other than the material currently being processed, whether it is another material or empty space.

At block 406, the design validation engine 218 determines whether the partial segmented design is fabricable based on the paintbrush pattern for the material. If the paintbrush pattern can be used to create the partial segmented design, then the partial segmented design is fabricable for the material. By way of example, one may consider the segmented design 100 of FIG. 1 in view of a 2 by 2 paintbrush pattern. A 2 by 2 paintbrush pattern could be used to fill the first pattern 104 and the second pattern 106. However, the third pattern 108 cannot be painted by a 2 by 2 paintbrush pattern because it is only one segment tall. As such, the segmented design 100 would not be fabricable based on a 2 by 2 paintbrush pattern. If, instead, the paintbrush pattern was 1 segment tall and 2 segments wide, all three of the patterns in the segmented design 100 could be painted by the paintbrush pattern, and so the segmented design 100 would be fabricable. As noted above, this technique is not limited to the two-dimensional patterns illustrated in FIG. 1, but two-dimensional patterns are illustrated for the sake of clarity. In some embodiments, three-dimensional patterns are used.

Any suitable technique may be used to determine whether the paintbrush pattern can be used to create the partial segmented design. In some embodiments, the design validation engine 218 may attempt to determine a tiling by moving the paintbrush pattern through the segments of the partial segmented design that include the material to determine whether there is an arrangement in which all of the segments that include the material can be covered with no segments that do not include the material being covered. If such a tiling can be found, then the partial segmented design is determined to be fabricable.

In some embodiments, instead of searching for a valid tiling of the paintbrush pattern, the design validation engine 218 may determine one or more forbidden patterns based on the paintbrush pattern. The forbidden patterns include patterns that cannot be created using the paintbrush pattern. For example, if the paintbrush pattern is a 2 by 2 square, then one example forbidden pattern may be a 1 by 3 pattern that includes a segment of the material flanked by segments that do not include the material. Once a set of forbidden patterns is determined, the design validation engine 218 may search the partial segmented design to determine if any of the forbidden patterns are present. If any forbidden patterns are found, then the partial segmented design is not fabricable. If no forbidden patterns are found, then the partial segmented design is fabricable for the material.

The method 300 then proceeds to the for-loop end block 408. If further materials remain to be processed, then the method 300 returns to for-loop start block 402 to process the next material. Otherwise, the method 300 proceeds to a decision block 410.

At decision block 410, a determination is made regarding whether the proposed segmented design is fabricable. The design validation engine 218 may determine that the proposed segmented design is fabricable if all of the partial segmented designs are fabricable, and may determine that the proposed segmented design is not fabricable if any one of the partial segmented designs are not fabricable.

If the determination is that the proposed segmented design is fabricable, then the result of decision block 410 is YES, and the method 300 proceeds to block 412. At block 412, the design validation engine 218 transmits the proposed segmented design to the manufacturing device 206 for fabrication. In some embodiments, the transmission of the proposed segmented design to the manufacturing device 206 may be optional, in that in some embodiments, the design validation system 202 may simply store an indication with the proposed segmented design that the proposed segmented design is fabricable, or may present an indication to a user that the proposed segmented design is fabricable, instead of transmitting the proposed segmented design to the manufacturing device 206. The method 300 then proceeds to an end block and terminates.

Returning to the decision block 410, if the determination is that the proposed segmented design is not fabricable, then the result of decision block 410 is NO, and the method 300 advances to block 414. At block 414, the design validation engine 218 transmits a command to the manufacturing device 206 to change a manufacturing capability of the manufacturing device 206. The change may include any configurable option of the manufacturing device 206 that could change the manufacturing capability. For example, an extruder could be reconfigured to use a different temperature, a print head could be reconfigured to use a different spray pattern or rate, a laser could be reconfigured to use a different wavelength, or any number of other configurable options. After the command is transmitted, the method 300 advances to a continuation terminal ("terminal B") in order to return to block 302 to recharacterize the manufacturing device and determine whether the proposed segmented design is fabricable after the manufacturing capability is changed. Though no end to the method 300 is illustrated after the NO branch of decision block 410, in some embodiments, the method 300 does not loop indefinitely, but instead only advances from decision block 410 to block 414 a limited number of times before ending.

In some embodiments, the actions of the method 300 after the NO branch of decision block 410 may be optional, particularly if the manufacturing device 206 does not include a manufacturing capability that can be automatically reconfigured. In some such embodiments, the design validation system 202 may simply store or present an indication that the proposed segmented design is not fabricable. In other such embodiments, the design validation system 202 may transmit a notification to the design generation system 204 that the proposed segmented design was not fabricable, in order to allow the design generation system 204 to alter the proposed segmented design. In yet other such embodiments, changes could automatically be made to the proposed segmented design to make the proposed segmented design fabricable. For example, features that were found to be too small to be fabricated could be enlarged until they were large enough, and the revised segmented design could be either fabricated, presented to a user to show the changes that would make the proposed segmented design fabricable, or provided to an automated design process in order to test the performance of the revised segmented design.

One will recognize that certain aspects of the method 300 may be changed in some embodiments of the present disclosure. For example, in some embodiments, the manufacturing device characterization engine 214 may operate without receiving a scan from a scanning device 208. For example, the manufacturing device characterization engine 214 could use a reference specification that lists the expected physical characteristics of the manufacturing device 206 instead of using a scan of the actual manufacturing device 206 to be used. However, such embodiments may not achieve all of the benefits of the present disclosure.

As an example of a benefit of using a scan, differences between different manufacturing devices of the same model can be detected and compensated for. Such differences might arise through wear and tear, differences in assembly, differences in installation, or other reasons. As another example of a benefit provided by a scan, different environmental conditions that may affect the manufacturing capability may be detected by a scan of the actual manufacturing device 206 or a sample object produced by the manufacturing device 206. Ambient temperatures, humidity differences, altitude differences, and other factors may affect the manufacturing capability. As still another example of a benefit of using a scan of a sample object, differences in a quality of a filament or other consumable material used by the manufacturing device 206 may be detected, even amongst manufacturing devices that are otherwise identical.

Figure 5:
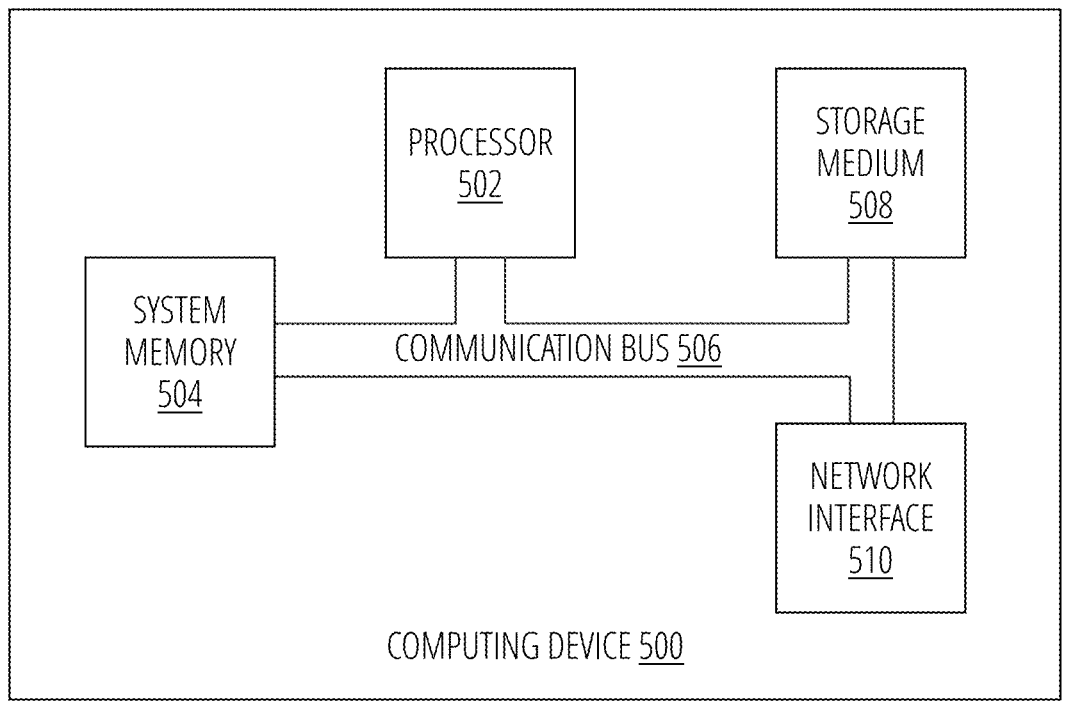
FIG. 5 is a block diagram that illustrates a non-limiting example embodiment of a computing device appropriate for use as a computing device with embodiments of the present disclosure.

FIG. 5 is a block diagram that illustrates aspects of an exemplary computing device 500 appropriate for use as a computing device of the present disclosure. While multiple different types of computing devices were discussed above, the exemplary computing device 500 describes various elements that are common to many different types of computing devices. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 510 illustrated in FIG. 5 may represent one or more wireless interfaces or physical communication interfaces described and illustrated above with respect to particular components of the computing device 500.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, Bluetooth low energy, USB, or other suitable connections protocols using wireless or physical connections. Similarly, the computing device 500 may also include output devices such as a display, speakers, printer, etc. Since these devices are well known in the art, they are not illustrated or described further herein.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, cause the computing system to perform actions comprising:
    characterizing, by the computing system, a manufacturing capability of a manufacturing device;
    determining, by the computing system, a paintbrush pattern based on the characterization of the manufacturing capability of the manufacturing device;
    receiving, by the computing system, a proposed design; and
    determining, by the computing system, whether the proposed design is fabricable by the manufacturing device based on the paintbrush pattern.

2. The non-transitory computer-readable medium of claim 1, wherein the actions further comprise:
    in response to determining that the proposed design is fabricable, transmitting, by the computing system, the proposed design to the manufacturing device for fabrication.

3. The non-transitory computer-readable medium of claim 1, wherein the actions further comprise:
    in response to determining that the proposed design is not fabricable:
        changing, by the computing system, a setting of the manufacturing device that changes the manufacturing capability of the manufacturing device;
        recharacterizing, by the computing system, the manufacturing device with the changed setting;
        determining, by the computing system, an updated paintbrush pattern based on the recharacterization of the manufacturing capability of the manufacturing device; and
        determining, by the computing system, whether the proposed design is fabricable by the manufacturing device based on the updated paintbrush pattern.

4. The non-transitory computer-readable medium of claim 1, wherein characterizing the manufacturing capability of the manufacturing device includes:
    receiving a scan of at least a portion of the manufacturing device, wherein the portion of the manufacturing device is an extruder nozzle, a print head, a lens, or an LCD panel; and
    conducting a measurement of the scan of the manufacturing device.

5. The non-transitory computer-readable medium of claim 1, wherein characterizing the manufacturing capability of the manufacturing device includes:
    receiving a scan of a sample object manufactured by the manufacturing device, wherein the sample object includes at least one feature designed to stress at least one of a minimum feature size and a minimum feature shape of the manufacturing device; and
    conducting a measurement of the scan of the sample object to determine at least one of the minimum feature size and the minimum feature shape the manufacturing device is capable of generating.

6. The non-transitory computer-readable medium of claim 1, wherein the paintbrush pattern and the proposed design include sets of three-dimensional voxels.

7. The non-transitory computer-readable medium of claim 6, wherein the voxels are asymmetrical in at least one dimension.

8. The non-transitory computer-readable medium of claim 6, wherein the proposed design includes a set of three-dimensional voxels that represent a first material, and a set of three dimensional voxels that represent empty space;
    wherein the voxels that represent the first material have at least one of a different size and a different shape from the voxels that represent the empty space.

9. The non-transitory computer-readable medium of claim 1,
    wherein characterizing the manufacturing capability of the manufacturing device includes:
        characterizing a first manufacturing capability of the manufacturing device for a first material; and
        characterizing a second manufacturing capability of the manufacturing device for a second material; and
    wherein determining the paintbrush pattern based on the characterization of the manufacturing capability of the manufacturing device includes:
        determining a first paintbrush pattern based on the characterization of the first manufacturing capability; and
        determining a second paintbrush pattern based on the characterization of the second manufacturing capability.

10. The non-transitory computer-readable medium of claim 9, wherein the proposed design includes a pattern that includes voxels that represent locations of the first material and voxels that represent locations of the second material, and wherein the determining whether the proposed design is fabricable by the manufacturing device based on the paintbrush pattern includes:

separating the proposed design into a first proposed design and a second proposed design, wherein the first proposed design includes voxels that represent locations of the first material and voxels that represent locations of any other material, and wherein the second proposed design includes voxels that represent locations of the second material and voxels that represent locations of any other material;

determining whether the first proposed design is fabricable by the manufacturing device based on the first paintbrush pattern; and determining whether the second proposed design is fabricable by the manufacturing device based on the second paintbrush pattern.

11. The non-transitory computer-readable medium of claim 1, wherein determining whether the proposed design is fabricable by the manufacturing device based on the paintbrush pattern includes:

moving the paintbrush pattern to various locations in the proposed design to determine if the proposed design can be completely filled by the paintbrush pattern.

12. The non-transitory computer-readable medium of claim 1, wherein determining whether the proposed design is fabricable includes:

determining a set of forbidden patterns that cannot be generated by the manufacturing device based on the paintbrush pattern; and searching the proposed design for the forbidden patterns of the set of forbidden patterns.

13. A system, comprising:

a manufacturing device; and a design validation system, the design validation system including at least one computing device configured with logic that, in response to execution, causes the design validation system to perform actions comprising:

characterizing, by the design validation system, a manufacturing capability of the manufacturing device;

determining, by the design validation system, a paintbrush pattern based on the characterization of the manufacturing capability of the manufacturing device;

receiving, by the design validation system, a proposed design; and determining, by the design validation system, whether the proposed design is fabricable by the manufacturing device based on the paintbrush pattern.

14. The system of claim 13, further comprising a scanning device configured to perform actions including:

scanning at least a portion of the manufacturing device, wherein the portion of the manufacturing device is an extruder nozzle, a print head, a lens, or an LCD panel; and transmitting the scan of the manufacturing device to the design validation system.

15. The system of claim 14, wherein characterizing the manufacturing capability of the manufacturing device includes conducting a measurement of the scan of the manufacturing device.

16. The system of claim 13, further comprising a scanning device configured to perform actions including:

scanning a sample object manufactured by the manufacturing device, wherein the sample object includes at least one feature designed to stress at least one of a minimum feature size and a minimum feature shape of the manufacturing device; and transmitting the scan of the sample object to the design validation system.

17. The system of claim 16, wherein characterizing the manufacturing capability of the manufacturing device includes conducting a measurement of the scan of the sample object to determine at least one of the minimum feature size and the minimum feature shape the manufacturing device is capable of generating.

18. The system of claim 13, wherein the actions further comprise, in response to determining that the proposed design is fabricable, transmitting, by the design validation system, the proposed design to the manufacturing device; and wherein the manufacturing device is configured to perform actions comprising:

receiving the proposed design; and manufacturing the proposed design.

19. The system of claim 13, wherein the actions further comprise, in response to determining that the proposed design is not fabricable:

transmitting, by the design validation system, a command to the manufacturing device that changes the manufacturing capability of the manufacturing device;

recharacterizing, by the design validation system, the manufacturing device with the changed manufacturing capability;

determining, by the design validation system, an updated paintbrush pattern based on the recharacterization of the manufacturing device; and determining, by the design validation system, whether the proposed design is fabricable by the manufacturing device based on the updated paintbrush pattern.

20. The system of claim 13, wherein the manufacturing device is a vat polymerization device, a material jetting device, or a powder bed fusion device.

* * * * *